United States Patent
Yamanoha et al.

(10) Patent No.: US 10,084,866 B1
(45) Date of Patent: Sep. 25, 2018

(54) FUNCTION BASED DYNAMIC TRAFFIC MANAGEMENT FOR NETWORK SERVICES

(71) Applicant: Amazon Technologies, Inc., Seattle, WA (US)

(72) Inventors: David Y. Yamanoha, Shoreline, WA (US); Timothy Allen Gilman, Sumner, WA (US); Eugene Sheung Chee Lam, Renton, WA (US); Brady Montz, Issaquah, WA (US); Joel Ross Ohman, Seattle, WA (US); Dipanwita Sarkar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 302 days.

(21) Appl. No.: 14/981,431

(22) Filed: Dec. 28, 2015

(51) Int. Cl.
*H04L 29/08* (2006.01)
*H04L 12/851* (2013.01)

(52) U.S. Cl.
CPC .......... *H04L 67/16* (2013.01); *H04L 47/2441* (2013.01)

(58) Field of Classification Search
CPC .................................................. H04L 47/2441
See application file for complete search history.

(56) References Cited

U.S. PATENT DOCUMENTS

| | | | |
|---|---|---|---|
| 8,487,931 B2 * | 7/2013 | Gaul ..................... | G06T 11/203 345/440 |
| 8,850,263 B1 | 9/2014 | Yourtee et al. | |
| 9,059,938 B1 | 6/2015 | Strand et al. | |
| 2012/0311098 A1 * | 12/2012 | Inamdar .............. | G06F 11/3404 709/219 |
| 2015/0213499 A1 * | 7/2015 | Omoigui .............. | G06K 15/002 705/7.31 |
| 2016/0292733 A1 * | 10/2016 | Ranjan ................ | G06Q 30/0256 |

OTHER PUBLICATIONS

Bakhshi et al., "User Traffic Profiling", Nov. 5, 2015, IEEE, Internet Technologies and Applications (ITA), p. 91-97.*
Web article: "Apache Kafka" published 2015 [online][retrieved on Dec. 15, 2015] retrieved from: kafka.apache.org, 1 page.

* cited by examiner

*Primary Examiner* — Brian J Gillis
*Assistant Examiner* — Amy Ling
(74) *Attorney, Agent, or Firm* — Lee & Hayes, PLLC

(57) ABSTRACT

Technologies are disclosed for local and distributed function based dynamic traffic management for network services. A service host executes a network service and provides a service framework that includes one or more handlers. When a request is received for the service, one of the handlers assigns a classification to the request. The handler then provides the classification to a dynamic function based traffic controller. The controller determines whether the network service is to process the request based on the classification of the request, metrics associated with the network service, and a local traffic management policy. If the controller determines that the network service is not to process the request, the request is rejected. Otherwise, the request is passed to the network service for processing. Metrics can also be provided from the service host to a distributed performance monitoring system for use in managing network traffic at a fleet level.

20 Claims, 8 Drawing Sheets

FUNCTION BASED DYNAMIC TRAFFIC MANAGEMENT FOR NETWORK SERVICES

BACKGROUND

One approach to throttling requests made to network services involves specifying the maximum number of requests per second, or other time period, that are permitted to be made to the network service. Any requests that are received in excess of the specified maximum number of requests in a given time period are throttled (i.e. rejected). This mechanism is sometimes referred to as "static throttling."

The static throttling mechanism described above suffers from several drawbacks. For example, the operator of a network service might not have control over all of the processes that are executed on the service host computer utilized to execute a network service. For instance, the operator might not have control over the periodic execution of maintenance tasks on the service host. These maintenance tasks consume central processing unit ("CPU") cycles, memory, and, potentially, other resources that might otherwise be available for use by the network services.

A network service operator might, therefore, specify the maximum number of requests that are permitted to be made to a network service in a given time period pessimistically in view of the possibility that other processes might utilize CPU cycles, memory, or other resources of the service host, even though the other processes might only be executed periodically. As a result, the true capacity of a network service to process requests might not be realized.

It is with respect to these and other considerations that the disclosure made herein is presented.

DETAILED DESCRIPTION

Figure 1:
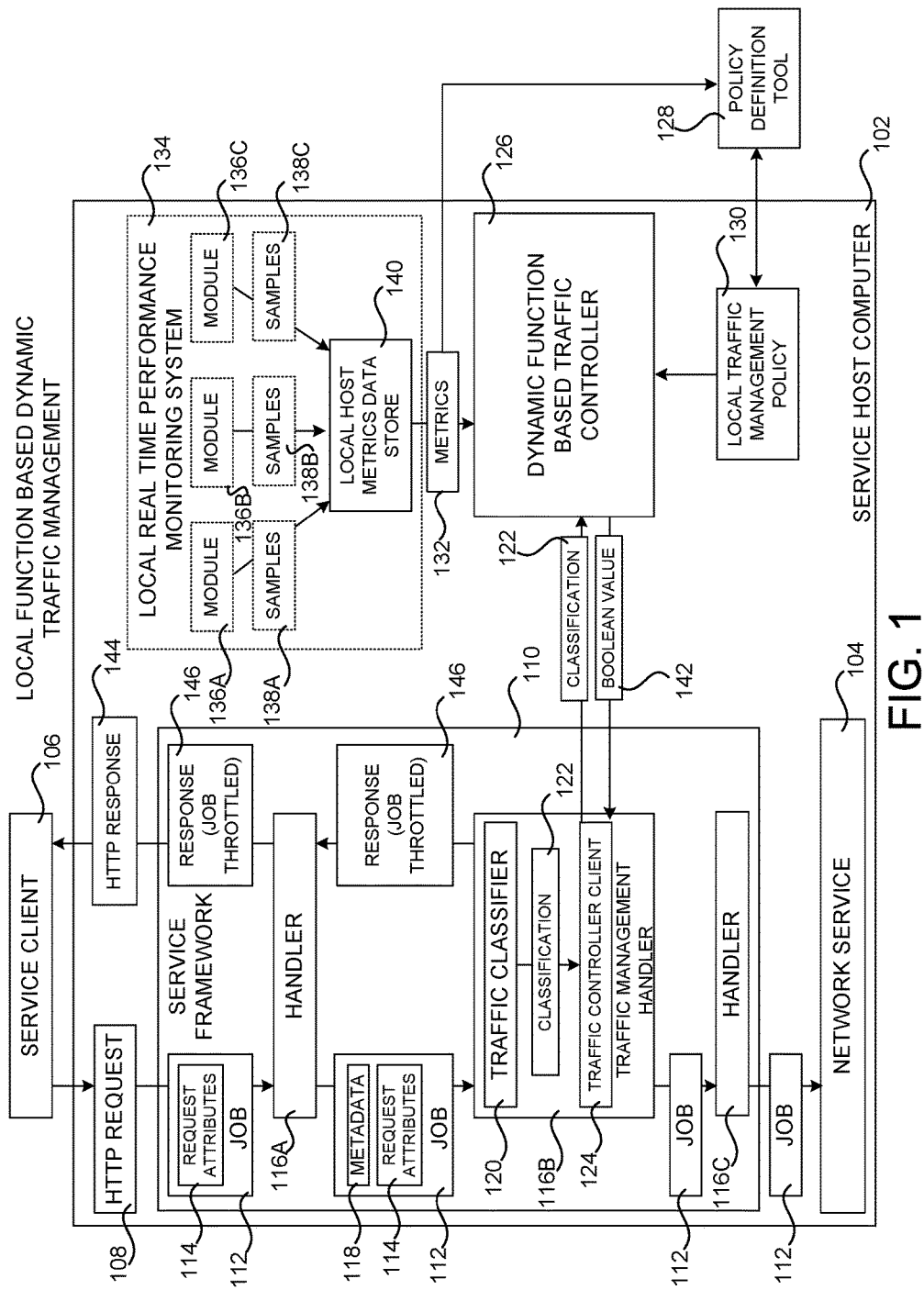
FIG. 1 is a network services architecture diagram showing aspects of a mechanism disclosed herein for local function based dynamic traffic management for network services, according to one configuration presented herein.

The following detailed description is directed to technologies for local and distributed function based dynamic traffic management for network services. Through an implementation of the technologies described herein, requests made to network services can be throttled based upon both the type of the request and real time metrics obtained from the network service and/or the network service host. In this way, service requests can be throttled based upon the actual utilization of computing resources (e.g. CPU cycles and random access memory ("RAM")) on the service host rather than upon a statically defined request limit. Consequently, operation of the service host can be optimized to maximize the number of requests handled by the service host. Moreover, because requests are throttled based up actual real time metrics describing the state of computing resources on the service host, network services can be configured to operate more reliably by throttling incoming requests when the utilization of particular resources reaches a specified level. Technical benefits other than those specifically disclosed above can also be realized through implementations of the technologies disclosed herein.

In one particular implementation, a mechanism is provided for local function based dynamic traffic management for network services (which might be referred to herein simply as "services" or "a network service"). In order to utilize this mechanism, a graphical user interface ("GUI") is provided in one configuration through which a service operator can define a local network traffic management policy. The local network traffic management policy defines parameters that are utilized to throttle traffic directed to a network service executing on a service host.

In one specific configuration, the local network traffic management policy is a local service traffic management function. The local service traffic management function is a polynomial function that takes as input the value of one or more metrics relating to a locally executing network service (e.g. CPU utilization, memory utilization, etc.), and provides as output a throttle rate for a particular classification of service requests. The throttle rate defines the rate at which service requests having a particular classification are to be throttled.

In this configuration, the GUI provides a user interface element through which a service operator or other user can define a curve representing the local service traffic management function. The user can be permitted to provide control points for the curve, to "drag" the control points to define the curve, and to specify the contour of the curve in different ways. The GUI can also provide functionality for specifying other properties of a local service traffic management function and/or for viewing the real time metrics described above. Other mechanisms can also be provided for permitting the definition of a local service traffic management function.

In one configuration, a service framework also executes on the service host computer executing the service. The service framework provides various types of functionality to the network service, including the ability to execute one or more handlers. When multiple handlers are specified for use, the handlers can be executed in a specified order. The ordered collection of handlers utilized in a particular service framework might be referred to herein as a "handler chain."

Each handler in a handler chain can perform different types of processing on a service request. For example, a handler might add metadata to the request for use by subsequent handlers in a handler chain. Other types of processing might also be performed. When the last handler in the handler chain has completed its processing, the request can be passed to the network service for processing. When the network service has completed its processing of the request, a response can be passed back up the service chain to the service client that made the initial request in a similar fashion.

In one configuration, a handler in the service chain executing within a service framework enables functionality for local function based traffic management. In particular, a handler can receive a service request and determine a classification for the request based upon various types of information. For example, and without limitation, the classification can be determined based upon attributes of the original request or upon metadata added to the request by previous handlers in the handler chain. Other types of data can also be utilized to assign a classification to the request.

Once a service request has been classified, the classification can be utilized, along with other information, to determine if the service request is to be throttled (i.e. rejected). For example, and without limitation, in one configuration the classification is provided to a dynamic function based traffic controller executing on the service host. The dynamic function based traffic controller is a software component that is configured to determine whether a request is to be throttled based upon the associated classification, the local traffic management policy described above, and one or more metrics associated with the network service (e.g. CPU utilization, cache hit/miss rate, memory utilization, etc.).

The dynamic function based traffic controller can obtain the metrics in real time from a local real time performance monitoring system also executing on the service host in one particular configuration. The local real time performance monitoring system can be configured to execute modules that generate the metrics by periodically sampling different resources provided by the service host and/or the network service. The rate at which the metrics are sampled can be predefined by an owner or operator of the network service. Different sampling rates can also be specified for different resources. For example, a metric relating to CPU utilization might be sampled at a different rate than a metric relating the memory utilization. The collected metrics can be stored and made available to the dynamic function based traffic controller in real or near-real time.

If the dynamic function based traffic controller determines that the service request is to be throttled, the request is rejected and a response message may be routed up the handler chain in the manner described above to the service client that transmitted the original service request. If the dynamic function based traffic controller determines that the service request is not to be throttled, the request can be provided to the next handler in the handler chain or directly to the network service if the handler performing the throttling is the last handler in the handler chain.

In another configuration, a mechanism similar to that described above can be utilized to perform distributed function based dynamic traffic management. In this configuration, a distributed traffic management policy can be defined utilizing a GUI similar to that described above. The distributed traffic management policy defines how service requests are to be throttled on a fleet-wide basis. In order to evaluate the distributed traffic management policy, metrics are collected from the network service host computers in a host fleet by a distributed performance monitoring system. The metrics can be collected in real or in near-real time as with the locally collected metrics described above.

A distributed function based traffic controller utilizes the distributed traffic management policy and the metrics provided by the distributed performance monitoring system to determine on a fleet-wide level whether to throttle certain types of service requests. If requests are to be throttled, the distributed function based traffic controller can send update events to the service hosts in the fleet instructing the service hosts to adjust the throttle rate for certain classifications of requests. The throttle rate can then be utilized in the manner described above to throttle incoming requests to each service host in the fleet. Additional details regarding the various components and processes described briefly above for function based dynamic traffic management for network services will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The configurations described herein can be practiced in distributed computing environments, where tasks are performed by remote processing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a network services architecture diagram showing aspects of a mechanism disclosed herein for local function based dynamic traffic management for network services, according to one configuration presented herein. As shown in FIG. 1, and described briefly above, a service host computer 102 (which might be referred to herein simply as a "service host") executes a network service 104. The network service 104 can provide different types of functionality to remote clients, such as the service client 106, via remote service calls. The service host computer 102 and the service client 106 can be implemented using tower, rackmount, or blade server computers, or using another type of computing device configured in the manner described herein to process service requests.

In one configuration, the service client 106 submits service requests to the network service 104 utilizing the Hypertext Transfer Protocol ("HTTP"). In the example shown in FIG. 1, for instance, the service client 106 has submitted the HTTP request 108 to the network service 104 executing on the service host computer 102. The HTTP request 108 can include headers and a data payload for consumption by the network service 104. For example, the HTTP request 108 might request that the network service 104 perform a specified processing task and return a response to the calling service client 106. The processing task performed by the network service 104 might include, but is not limited to, performing a computational task, retrieving data, and/or other types of functionality. In this regard, it should be appreciated that the mechanisms described herein are not dependent upon the particular functionality provided by the network service 104. It should also be appreciated that network protocols other than HTTP can be utilized to submit requests to the network service 104 in other configurations.

As also shown in FIG. 1 and described briefly above, the service host computer 102 also executes a service framework 110 in one particular configuration. The service framework 110 provides various types of functionality to the network service 104, including the ability to execute one or more handlers 116A-116C (which might be referred to herein collectively as "handlers 116" or singularly as "a handler 116"). When multiple handlers 116 are specified for use, the handlers 116 can be executed in an order specified by the owner or operator of the network service 104. As mentioned above, the ordered collection of handlers 116 utilized in a particular service framework 110 might be referred to herein as a "handler chain."

In one particular configuration, the service framework 110 is configured to convert incoming service requests, such as the HTTP request 108, into protocol-agnostic data structures referred to herein as "jobs." For instance, in the example shown in FIG. 1, the service framework 110 has converted the HTTP request 108 into a job 112. The job 112 includes data (referred to herein as "request attributes 114") from the original HTTP request 108. For example, the request attributes 114 can include the headers, source and destination network addresses, the payload, and/or any other information contained in the original HTTP request 108. In this manner, the handlers 116 in the service chain can process service requests without understanding the specifics of a particular transport protocol, such as HTTP. In this regard, it should be appreciated that the mechanisms disclosed herein are not limited to such an implementation, and that the technologies disclosed herein can be utilized without converting incoming service requests to jobs. Accordingly, the terms "job," "request," and "service request" may be used interchangeably herein.

As mentioned above, each handler 116 in a handler chain can inspect the contents of a job 112 and perform different types of processing on the job 112. For example, and without limitation, a handler 116A might add metadata 118 to a job 112. The metadata 118 can be utilized by subsequent handlers 116 in a handler chain or by the network service 104. Other types of processing might also be performed.

One example of the functionality that can be provided by a handler 116 is classifying a service request as being generated by a human or by a non-human initiated process (which might be referred to herein as a "robot" or "bot"). Such a handler 116 might write metadata 118 to the job 112 specifying the computed probability that the request was originated by a human or a bot. Another handler 116 might write metadata 118 to the job 112 specifying the identity of a user associated with the service request. As will be discussed in detail below, decisions as to whether to throttle (i.e. reject) a particular service request can be made based upon the metadata 118 written to a job 112 by one or more of the handlers 116.

Each handler 116 in a handler chain can also reject a particular job 112 or allow the job 112 to continue on to subsequent handlers 116 in the handler chain. When the last handler 116 in a handler chain (i.e. the handler 116C in the example shown in FIG. 1) has completed its processing, the job 112 can be passed to the network service 104 for processing. When the network service 104 has completed its processing of the job 112, a response can be passed back up the service chain to the service client 106 that made the initial request (i.e. the HTTP request 108 shown in FIG. 1) in a similar fashion. In the example shown in FIG. 1, an HTTP response 144 has been transmitted to the service client 106.

In one configuration, a handler 116 in the service chain executing within the service framework 110 enables functionality for local function based traffic management. In particular, and as discussed briefly above, a handler 116B can receive a job 112 and determine a classification 122 for the job 112 based upon various types of information. For example, and without limitation, the classification 122 can be determined based upon the request attributes 114 included in the job 112 from the original HTTP request 108. The classification 122 can also be made based upon the metadata 118 added to the request by previous handlers 116 in the handler chain. Other types of data can also be utilized to assign a classification 122 to a service request.

The handler 116B that is configured to provide the service traffic management functions disclosed herein can be positioned at any point in the handler chain. It should be appreciated, however, that it might be desirable to position the handler 116B closer to the service client 106 (i.e. closer to the beginning of the handler chain) in order to avoid the performance of unnecessary work by previous handlers 116 in the handler chain in the event that a request is throttled. Any handlers 116 that add or modify metadata 118 that the handler 116B utilizes for classification will, however, need to be located prior to the handler 116B in the handler chain.

In the example configuration shown in FIG. 1, a traffic classifier 120 examines the metadata 118 and/or the request attributes 114 to determine a classification 122 for the job 112. In the example discussed above wherein the metadata 118 specifies a probability that the request was generated by a bot, the classification 122 might for example indicate that the request was generated by a bot or by a human. Other types of classifications 122 can also be assigned to a job 112. For example, and without limitation, a job 112 can be classified based upon the size of the job 112, the amount of computing resources expected to be consumed during processing of the job 112, and/or other factors. Additionally, multiple classifications 122 can also be assigned to the same job 112.

Once a service request has been classified, the classification 122 can be utilized, along with other information, to determine if the service request is to be throttled (i.e. rejected). For example, and without limitation, in one configuration the traffic classifier 120 provides the classification 122 to a traffic controller client 124. The traffic controller client 124 is configured to interoperate with a dynamic function based traffic controller 126, also executing on the service host computer 102. The dynamic function based traffic controller 126 is a software component that is configured to determine whether a service request is to be throttled based upon the associated classification 122, the local traffic management policy 130 described briefly above, and one or more metrics 132 associated with the network service 104 (e.g. CPU utilization, cache hit/miss rate, memory utilization, etc.). Additional details regarding this process are provided below.

In order to utilize the mechanism shown in FIG. 1, a policy definition tool 128 is provided in one particular configuration. The policy definition tool 128 is a software component configured to provide a GUI through which a user, such as the operator of the network service 104, can define the local network traffic management policy 130. As mentioned above, the local network traffic management policy 130 defines parameters that are utilized by the dynamic function based traffic controller 126 in one configuration to throttle service requests directed to the network service 104.

In one specific configuration, the local network traffic management policy 130 is a local service traffic management function. The local service traffic management function is a polynomial function that takes as input the value of one or more metrics 132 relating to the locally executing network service 104 (e.g. CPU utilization, memory utilization, etc.), and provides as output a throttle rate for a particular classification 122 of service requests. The throttle rate defines the rate at which service requests having a particular classification 122 are to be throttled.

In this configuration, the GUI provided by the policy definition tool 128 includes a user interface element through which a service operator or other user can define a curve representing the local service traffic management function. The user can be permitted to provide control points for the curve, to "drag" the control points to define the curve, and to specify the contour of the curve in different ways. The GUI can also provide functionality for specifying other properties of a local service traffic management function and/or for viewing the real time metrics 132 described above.

It should be appreciated that the policy definition tool 128 can be implemented as a web application hosted by the service host computer 102 or another computer system. The policy definition tool 128 can also be implemented as a stand-alone application capable of connecting to the service host computer 102 in other configurations. Additional details regarding the operation of the policy definition tool 128 and an illustrative GUI for defining a local service traffic management function will be provided below with regard to FIG. 5.

It should also be appreciated that other mechanisms can also be utilized in other configurations for defining the local network traffic management policy 130. For example, a management console, command line interface ("CLI"), configuration file, or network service application programming interface ("API") can be utilized to define the local traffic management policy 130 and to provide the local traffic management policy 130 to the dynamic function based traffic controller 126 in other configurations.

As mentioned briefly above, the dynamic function based traffic controller 126 can obtain the metrics 132 in real or near-real time from a local real time performance monitoring system 134, also executing on the service host computer 102 in one particular configuration. The local real time performance monitoring system 134 can be configured to execute modules 136A-136C that generate the metrics 132 by periodically (e.g. every 500 ms) sampling different resources provided or utilized by the service host computer 102 and/or the network service 104. For example, and without limitation, a module 136A might sample data indicating the utilization of one or more CPUs of the service host computer 102. Another module 132B might sample data indicating the amount of RAM being utilized by a virtual machine ("VM") instance executing on the service host computer 102. As discussed briefly above, the sampling rate can be predefined by an owner or operator of the network service. Different sampling rates can also be specified for different resources. For example, a metric relating to CPU utilization might be sampled at a different rate than a metric relating the memory utilization.

The samples 138A-138C generated by the modules 136A-136C can include data identifying the particular feature that was sampled, a value describing the state of the feature, and a timestamp indicating the time and/or date that the sample 138 was taken. The samples 138A-138C can include other information in other configurations.

The local real time performance monitoring system 134 can process the samples 138A-138C collected by the modules 136A-136C, respectively, in different ways to generate the metrics 132. For example, various functions can be applied to the samples 136A-136C, such as a blending function, a smoothing function or an averaging function, in order to generate the metrics 132. The metrics 132 can then be stored, such as in the local host metrics data store 140 in the configuration shown in FIG. 1, and made available to the dynamic function based traffic controller 126 in real or near-real time. In one configuration, the local host metrics data store 140 is an in-memory database of time series data for a particular metric 132 for a particular time period (e.g. the previous ten seconds). Various types of APIs can be exposed for enabling communication between the local real time performance monitoring system 134 and the dynamic function based traffic controller 126.

The modules 136 can also be configured to obtain metrics 132 from the network service 104. For example, and without limitation, the metrics 132 can describe the number of a particular type of operation performed by the network service 104 within a particular time period (e.g. the number of requests to a certain method within the last ten seconds). As another example, a metric 132 might describe the number of database connections that the network service 104 currently has open. In this regard, it should be appreciated that the modules 136 are pluggable, and that the particular modules 136 that are utilized can be defined by the operator of the network service 104 in one particular configuration.

The dynamic function based traffic controller 126 can utilize the local traffic management policy 130, the classification 122, and the metrics 132 to determine if a request is to be throttled. The dynamic function based traffic controller 126 returns a Boolean value (e.g. Yes or No) to the traffic controller client 124 indicating whether the request (i.e. the job 112 in the example shown in FIG. 1) is to be throttled. If no local traffic management policy 130 applies to a particular request, the request is permitted to pass through to the next handler 116 in the handler chain or to the network service 104, as appropriate.

In one particular configuration, the dynamic function based traffic controller 126 utilizes token buckets representing a measure of an available resource on the service host computer 102. When a request is received, a list of keys are generated that are associated with the computing resources needed to process the request. For each of the keys, the dynamic function based traffic controller 126 checks to determine if a token bucket is associated with the key. If one is found, a token is removed. If there are no tokens to remove (i.e. the token bucket is empty), the request will be throttled.

Token buckets consist of a maximum number of tokens in a bucket and a token refresh rate. In real or near-real time, the dynamic function based traffic controller 126 receives the metrics 132. As discussed above, the metrics 132 can be combined with the local traffic management policy 130 to infer the adjustments that need to be made to the token buckets in order to enforce the local traffic management policy 130. For example, if an increased time to process responses can be correlated to high memory utilization on the service host computer 102, the operator of the network service 104 might want to define a local traffic management policy 130 that throttles less important requests more aggressively in the case of high memory utilization in order to keep latencies low. Other configurations can also be utilized in addition to or as an alternative to the token buckets described above.

If the dynamic function based traffic controller 126 determines that a service request is to be throttled, the request is rejected and a response 146 can be routed up the handler chain in a manner similar to that described above to the service client 106 that transmitted the original service request. In the example configuration shown in FIG. 1, for instance, an HTTP response 144 can be returned to the service client 106 indicating that the HTTP request 108 was throttled. If the dynamic function based traffic controller 126 determines that the service request is not to be throttled, the job 112 can be provided to the next handler 116 in the handler chain or directly to the network service 104 if the handler 116 performing the throttling (i.e. the handler 116B in the configuration shown in FIG. 1) is the last handler 116 in the handler chain.

In one particular configuration, for example, the mechanism described above with regard to FIG. 1 can be utilized to linearly or non-linearly reduce the total rate of requests processed by the network service 104 as the utilization of the CPU or memory of the service host computer 102 rises in a manner specified by the local traffic management policy 130. As another example, this mechanism can be utilized to adjust the allowed request rate for a specific operation that depends upon a cache in the service host computer 102 as a function of the cache hit/miss rate. As another example, the mechanism described above can be utilized to prioritize access to a database or other resource utilized or provided by the service host computer 102 for a specific user or group of users. In yet another example, the mechanism described above can be utilized to throttle requests for database writes more greatly than requests for database reads, and to throttle new requests more than requests that are being retried. It should be appreciated that these examples are merely illustrative and that other configurations can be utilized to throttle particular classifications of requests as a function of the local traffic management policy 130 and one or more real time metrics 132.

It should also be appreciated that while the dynamic function based traffic controller 126 and the local real time performance monitoring system 134 are shown in FIG. 1 as executing outside of the service framework 110, these components may be executed within the service framework 110 or within a handler 116 within the service framework 110 in other configurations. Similarly, while the traffic classifier 120 is shown as illustrating within the handler 116B in FIG. 1, this component can also be executed outside of the handler 116B or outside the service framework 110 altogether in other configurations. The disclosed functionality can also be implemented within the network service 104 in other configurations in order to enable throttling based upon other data accessible to or maintained by the network service 104. Other configurations can also be utilized. Additional details regarding the mechanism shown in FIG. 1 for local function based dynamic traffic management will be provided below with regard to FIGS. 2 and 5.

Figure 2:
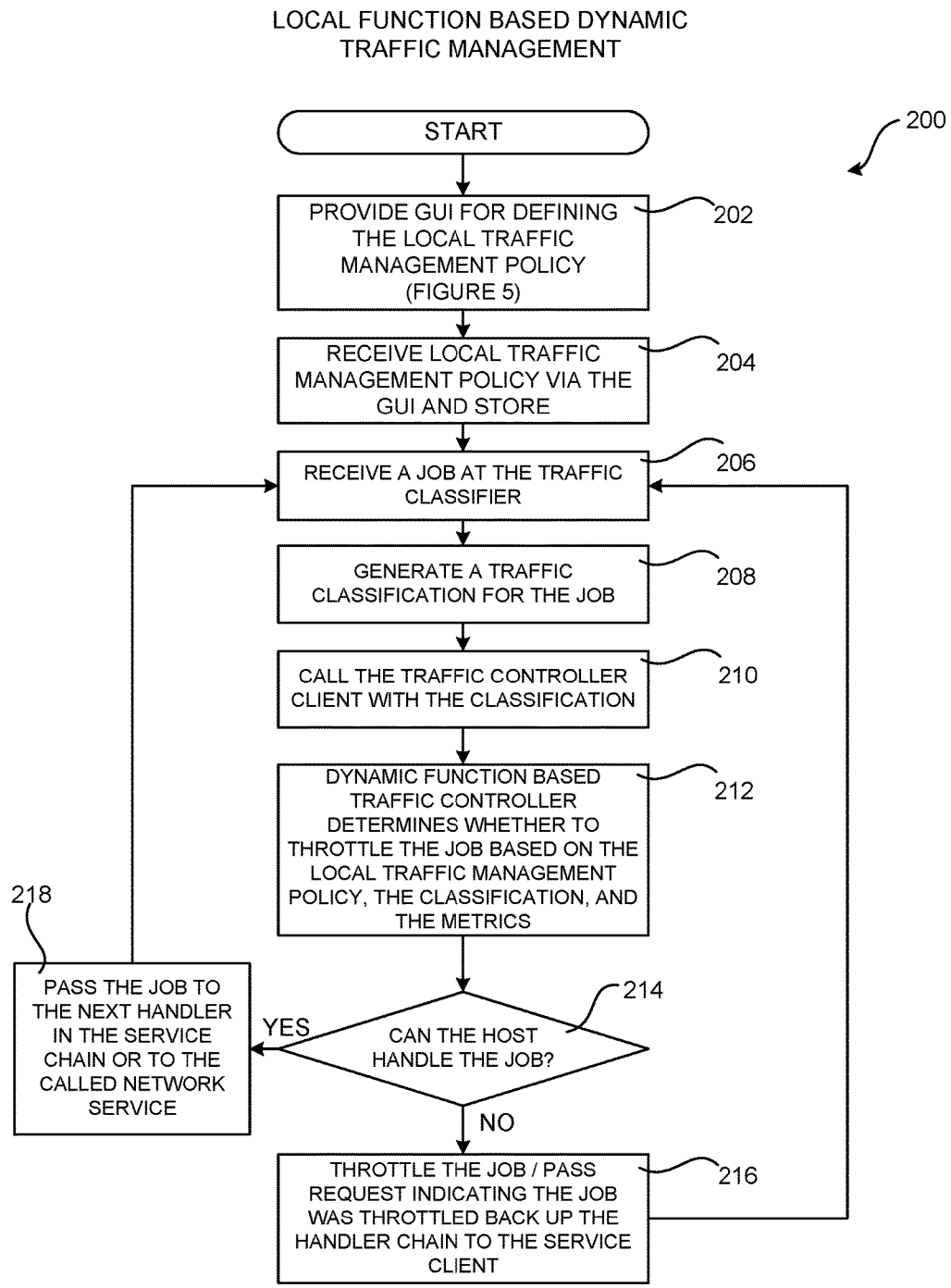
FIG. 2 is a flow diagram showing a routine that illustrates aspects of the operation of the mechanism shown in FIG. 1 for local function based dynamic traffic management for network services, according to one configuration presented herein.

FIG. 2 is a flow diagram showing a routine 200 that illustrates aspects of the operation of the mechanism shown in FIG. 1 for local function based dynamic traffic management for network services, according to one configuration presented herein. It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system.

Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where the policy definition tool 128 provides a GUI for defining the local traffic management policy 130. The routine 200 then proceeds from operation 204, where the local traffic management policy 130 is received via the GUI and stored in a location that is accessible to the dynamic function based traffic controller 126. For example, data defining the local traffic management policy 130 can be stored locally on the service host computer 102. As discussed above and in greater detail below with regard to FIG. 5, the GUI provided by the policy definition tool 128 provides functionality for enabling a user to graphically define a local traffic management function. Other mechanisms can also be utilized in other configurations to define the local traffic management policy 130.

From operation 204, the routine 200 proceeds to operation 206, where the handler 116B that implements the traffic classifier 120 receives a job 112. The routine 200 then proceeds from operation 206 to operation 208, where the traffic classifier 120 determines a classification 122 for the received job 122. As discussed above, the classification 122 for the job 112 can be determined based upon the request attributes 114, the metadata 118 generated by the other handlers 116, and/or other data available to the traffic classifier 122. Once the classification 122 has been determined, the routine 200 proceeds from operation 208 to operation 210.

At operation 210, the traffic classifier 120 calls the dynamic function based traffic controller 126 with the determined classification 122 for the job 112. The routine 200 then proceeds to operation 212, where the dynamic function based traffic controller 126 determines whether to throttle the job 112 based upon the local traffic management policy 130, the classification 122, and the relevant metrics 132 received from the local real time performance monitoring system 134. The routine 200 then proceeds from operation 212 to operation 214.

If the job 112 is to be throttled, the routine 200 proceeds to operation 216, where a response 146 can be passed back up the handler chain to the originating service client 106. If the job 112 is not to be throttled, the routine 200 proceeds to operation 218, where the job 112 can be passed to the next handler 116 in the handler chain or to the called network service 104, as appropriate. From operations 216 and 218, the routine 200 proceeds back to operation 206, where the processes described above can be repeated to throttle additional service requests.

It should be appreciated that the process illustrated in FIG. 2 and described above can be implemented as a pipeline so that multiple jobs 112 can be evaluated simultaneously. Moreover, it should be further appreciated that the process described above with regard to FIG. 2 can be implemented utilizing multiple processor threads. For example, and without limitation, one processor thread can be executed that updates the buckets described above based upon the metrics received from the real time performance monitoring system 134. Another processor thread can be executed that utilizes the buckets, the local traffic management policy 130, and the classification 122 to determine whether a job 112 is to be throttled. Other implementations can also be utilized in other configurations.

Figure 3:
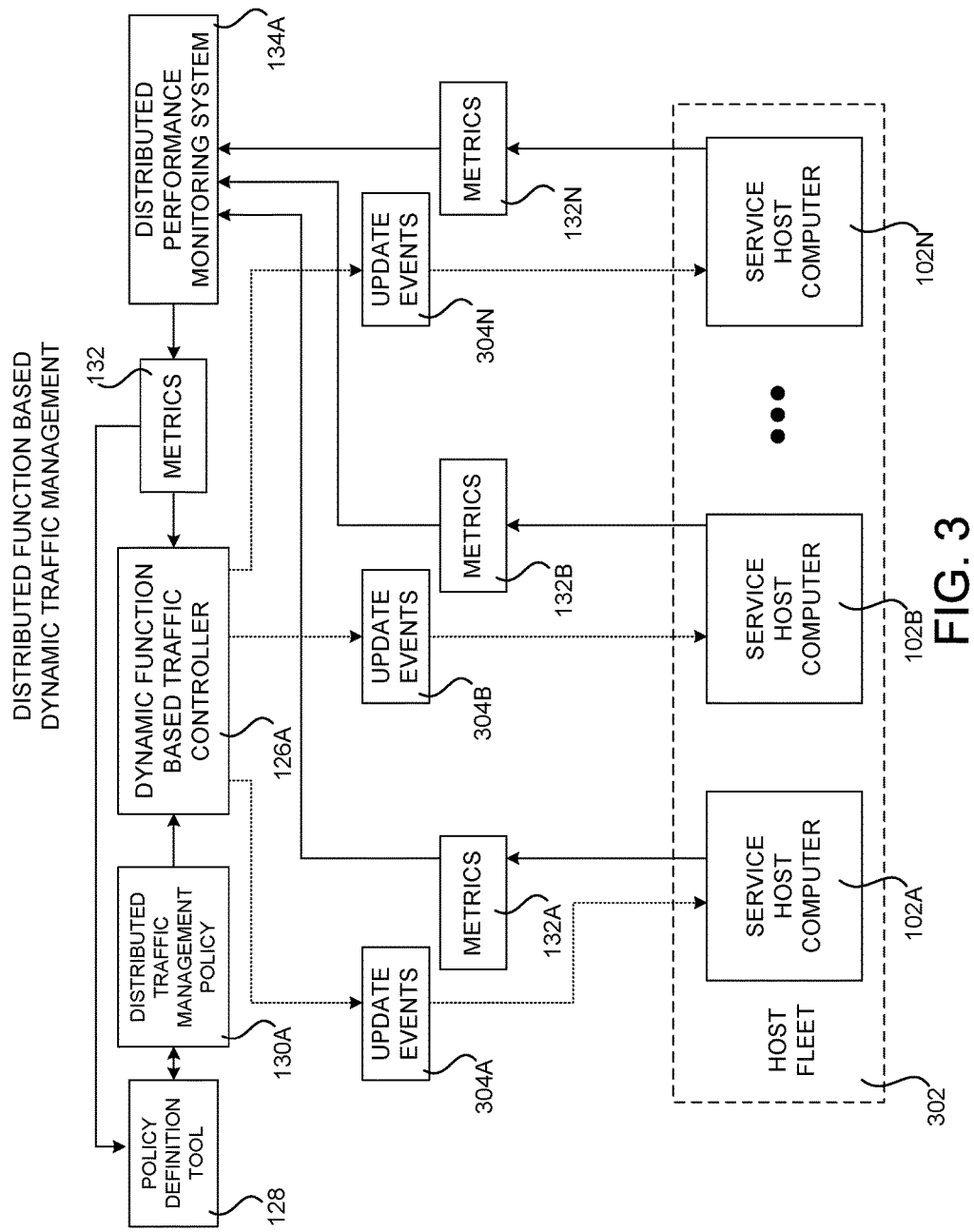
FIG. 3 is a network services architecture diagram showing aspects of a mechanism disclosed herein for distributed function based dynamic traffic management for network services, according to one configuration presented herein.

FIG. 3 is a network services architecture diagram showing aspects of a mechanism disclosed herein for distributed function based dynamic traffic management for network services, according to one configuration presented herein. As shown in FIG. 3 and described briefly above, a mechanism similar to that described above with regard to FIGS. 1 and 2 can be utilized to perform distributed function based dynamic traffic management. In this configuration, a number of service host computers 102A-102N (which might be referred to below collectively as the "service host computers 102"), are operated together as a part of a host fleet 302. Each of the service host computers 102 in the host fleet 302 can be configured in the manner described above with regard to FIGS. 1 and 2. In this example, however, the throttle rates for certain types of service requests can be set for all of the service host computers 102 in the host fleet 302 rather than for only a single service host computer 102.

In order to provide this functionality, a component on each of the service host computers 102, such as the local real time performance monitoring system 134, provides real or near-real time metrics 132A-132N, respectively, to a distributed performance monitoring system 134A. The distributed performance monitoring system 134A collects the metrics 132 from each of the service host computers 102 and makes the metrics 132 available to a dynamic function based traffic controller 126A.

The metrics 132 shown in FIG. 3 can be collected in real or in near-real time a manner similar to that described above with regard to FIGS. 1 and 2 for collecting metrics specific to a particular service host computer 102. In one configuration, the open source APACHE KHAFKA distributed messaging system is utilized to route the metrics 132A-132C to the distributed performance monitoring system 134A. Other types of messaging systems can be utilized in other configurations.

A distributed traffic management policy 130A can be also defined utilizing a GUI provided by the policy definition tool 128 similar to that described briefly above and in further detail below with regard to FIG. 5 for defining the local traffic management policy 130. The distributed traffic management policy 130A defines how service requests are to be throttled on a fleet-wide basis.

The distributed function based traffic controller 126A utilizes the distributed traffic management policy 130A and the metrics 132 provided by the distributed performance monitoring system 134A to dynamically determine the throttle rates on a fleet-wide level. The distributed function based traffic controller 126A can then send update events 304A-304C, respectively, to the service host computers 102 in the host fleet 302 instructing the service hosts 102 to adjust the throttle rate for certain classifications of requests. In one configuration, the open source APACHE KHAFKA distributed messaging system is utilized to route the update events 304A-304C to the service host computers 102 in the host fleet 302. Other types of messaging systems can be utilized in other configurations.

The adjusted throttle rate can then be utilized by the dynamic function based traffic controller 126 executing on each service host computer 102 in the manner described above with regard to FIGS. 1 and 2 to throttle incoming requests. Additional details regarding the operation of the system shown in FIG. 3 for distributed function based dynamic traffic management for network services will be provided below with regard to FIG. 4.

Figure 4:
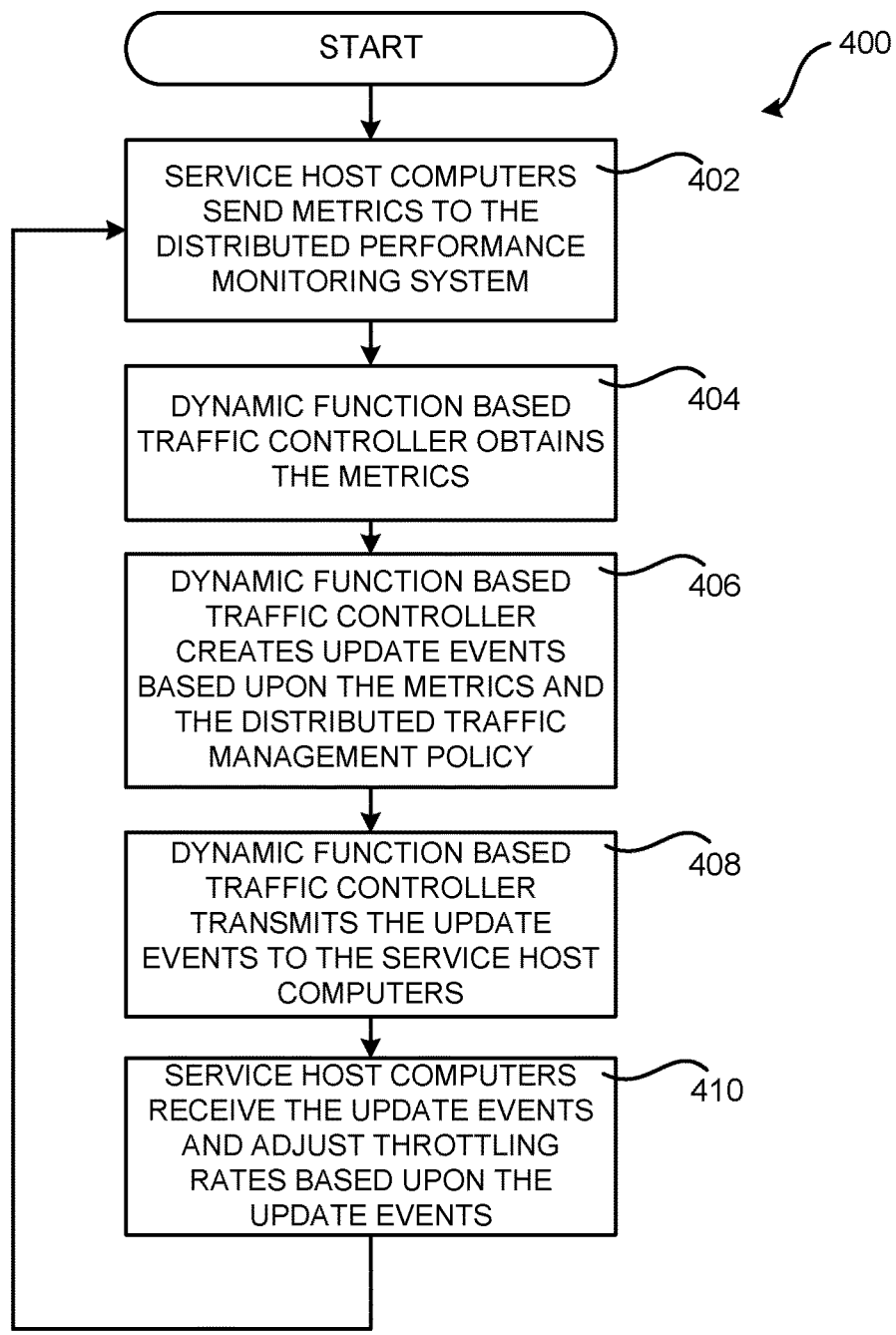
FIG. 4 is a flow diagram showing a routine that illustrates aspects of the operation of the mechanism shown in FIG. 3 for distributed function based dynamic traffic management for network services, according to one configuration presented herein.

FIG. 4 is a flow diagram showing a routine 400 that illustrates aspects of the operation of the mechanism shown in FIG. 3 for distributed function based dynamic traffic management for network services, according to one configuration presented herein. The routine 400 begins at operation 402, where the service host computers 102 in the host fleet 302 send metrics 132 to the distributed performance monitoring system 134A. In one configuration, the operator of the network service 104 can specify the particular metrics 132 that are routed to the distributed performance monitoring system 134. The metrics 132 can also be transmitted periodically, such as once every 500 ms or other time period.

From operation 402, the routine 400 proceeds to operation 404, where the dynamic function based traffic controller 126A obtains the metrics 132 from the distributed performance monitoring system 134A. The routine 400 then proceeds to operation 406, where the dynamic function based traffic controller 126A creates update events 304 based upon the metrics 132 and the distributed traffic management policy 130A. As discussed above, the update events 304 can specify updated throttle rates to be utilized by the dynamic function based traffic controller 126 executing on each of the service host computers 102 in the host fleet 302.

The routine 400 then proceeds to operation 408 where the dynamic function based traffic controller 126A transmits the update events 304 to the service host computers 102 in the host fleet 302. As discussed above, a distributed messaging system can be utilized in some configurations to transmit the metrics 132 to the distributed performance monitoring system 134A and to transmit the update events 304 to the service host computers 102 in the host fleet 302.

From operation 408, the routine 400 proceeds to operation 410, where the service host computers 102 in the host fleet 302 utilize the update events 304 to adjust the throttle rates utilized by the dynamic function based traffic controller 126. In the configuration described above, the token buckets can be adjusted based upon the throttle rates specific by the update events 304. The throttle rates can be adjusted in other ways in other configurations. From operation 410, the routine 400 proceeds back to operation 402, where the operations described above can be repeated.

Figure 5:
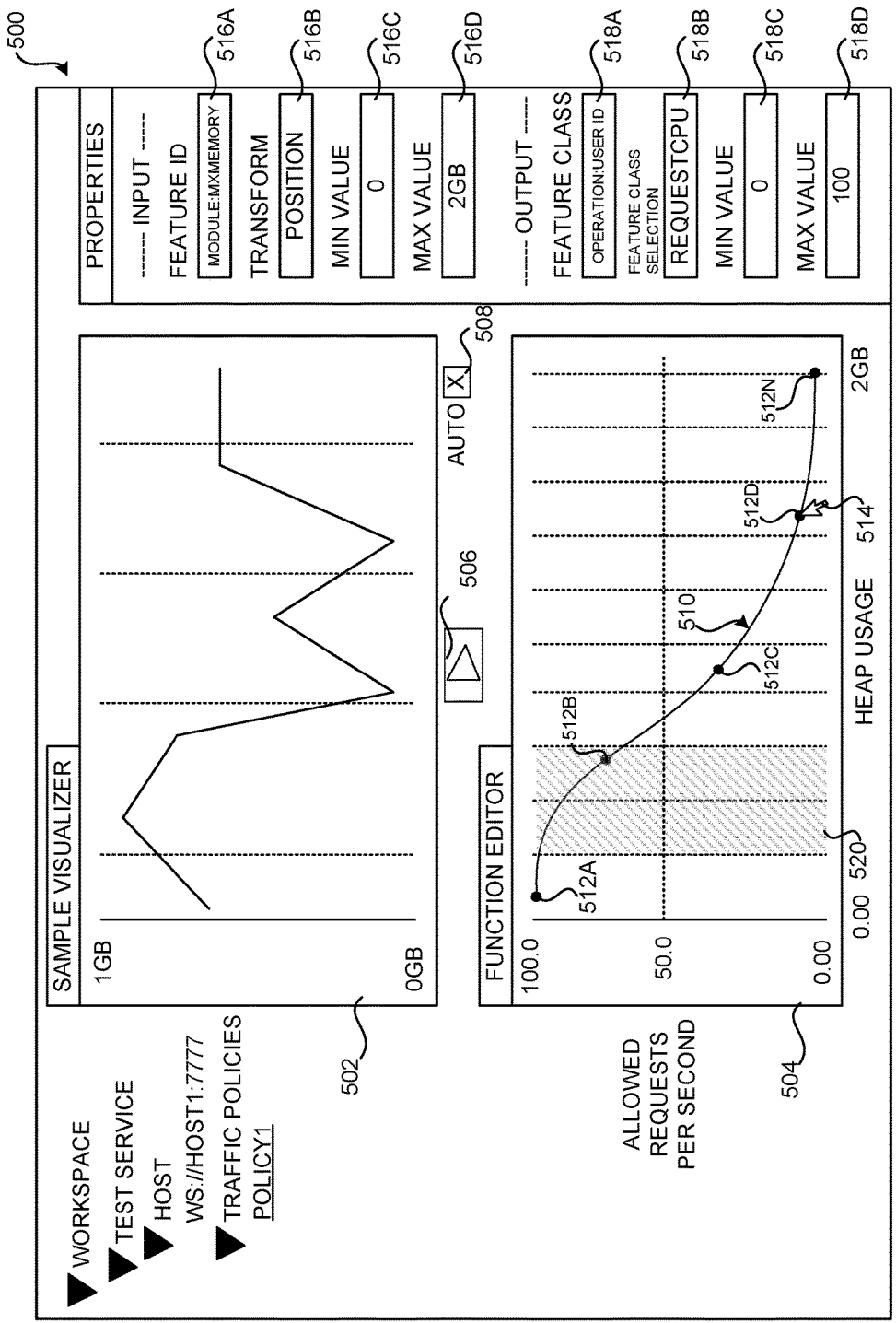
FIG. 5 is a graphical user interface diagram showing aspects of the configuration of one illustrative graphical user interface disclosed herein for defining a local or distributed traffic management policy, according to one configuration disclosed herein.

FIG. 5 is a GUI diagram showing aspects of the configuration of one illustrative GUI 502 for defining a local traffic management policy 130 or a distributed traffic management policy 130A, according to one configuration disclosed herein. In the specific example shown in FIG. 5, the GUI 502 is being utilized to define a local network traffic management policy 130 that includes a local service traffic management function.

As discussed above, the local service traffic management function is a polynomial function that takes as input the value of one or more metrics 132 relating to the execution of a network service 104 (e.g. CPU utilization, memory utilization, etc.), and provides as output a throttle rate for a particular classification 122 of service requests. The throttle rate defines the rate at which service requests having a particular classification 122 are to be throttled.

In the configuration shown in FIG. 5, the GUI 502 provides several user interface elements 502 and 504. The user interface element 502 provides functionality for displaying the values of one or more metrics 132 in real or near-real time. For example, a user interface (not shown in FIG. 5) can be provided through which a user can select the metrics 132 to be shown in the user interface element 502. In the example shown in FIG. 5, for instance, the user has selected a metric 132 relating to heap usage by a VM executing on the service host computer 102.

A user interface control 506 is also provided in the configuration shown in FIG. 5 which, when selected, will begin playback of the values for the selected metric 132 in real or near-real time. The X-axis of the user interface control 502 represents time, while the Y-axis of the user interface element 502 represents the value of the presented metric 132, or metrics 132. In one configuration, the most recently obtained values for the metric 132 will be presented on the right side of the user interface element 502. These values will move to the left as new values are presented. Accordingly, the values on the right side of the user interface element 502 for the metric 132 are the most recently sampled values, while the values presented on the left side of the user interface element 502 are older values. The user interface control 506 can also be selected in order to stop playback of the values for the metric 132 in the user interface element 502.

As discussed above with regard to FIG. 1, the policy definition tool 128 can be implemented as a network accessible web site in some configurations. In these configurations, a web socket can be established with the service host computer 102 to enable the metrics 132 to be transmitted to the policy definition tool 128 and presented in the GUI 500 in real or near-real time. The web socket can also be utilized to transmit commands received through the GUI 500, such as the definition of the local service traffic management function, described below. In this manner, the impact of changes made to the local traffic management policy 130 through the GUI 500 can be viewed in real or near-real time. A similar mechanism can be utilized when the policy definition tool 128 is implemented as a stand-alone application or in another manner.

A user interface control 508 is also presented in the illustrative GUI 500 shown in FIG. 5 for automatically adjusting the scale used for the Y-axis of the user interface element 502. In the example shown in FIG. 5, for instance, the user interface control 508 has been selected and, accordingly, the Y-axis of the user interface element 502 has been scaled to include only the range of values between the displayed minimum and maximum values for the displayed metric 132. The user interface control 508 can be de-selected to turn off the automatic adjustment of the scale used for the Y-axis of the user interface element 502 in this manner.

In the example shown in FIG. 5, a user interface element 504 is also provided through which the operator of the network service 104 can define a curve 510 representing the local service traffic management function. As discussed above, the input of the local service traffic management function are values for a metric 132 and the output of the function is a throttle rate for a particular classification 122 of service requests.

In order to begin the process of creating a local service traffic management function, the user first utilizes the user interface controls 516A-516D to specify one or more input properties and the user interface controls 518A-518B to specify one or more output properties of the local service traffic management function. In particular, the user interface control 516A can be utilized to specify the metric 132 that is to be utilized as the input to the local service traffic management function. In the example shown in FIG. 5, for instance, the user has specified a metric 132 relating to the usage of heap memory by a VM executing on a service host computer 102. As mentioned above, the specified metric 132 is represented on the X-axis of the user interface element 504.

The user interface control 516B can be utilized to specify whether the actual values for the metric 132 or the rate of change of the values of the metric 132 are to be utilized as input to the function. The user interface controls 516C and 516D can be utilized, respectively, to specify the minimum and maximum values for the metric 132 to which the defined function is to apply.

The user interface controls 518A and 518B can be utilized to specify the type of requests that are to be throttled by the defined local service traffic management function (i.e. the classification 122 of requests to which the defined function applies). The user interface controls 518C and 518D can be utilized, respectively, to specify the minimum and maximum values for output of the specified function.

Once the user has specified the input and output properties described above, the user can define a curve 510 representing the local service traffic management function in the user interface element 504. In particular, the user can utilize an appropriate input device, such as a mouse, touchscreen, or touch-sensitive trackpad, to define the curve 510. The user can also be permitted to provide control points 512A-512N defining the curve, to select and "drag" the control points 512A-512N using the cursor 514 to define the curve 510 and, potentially, to specify the contour of the curve 510 in different ways. Data defining the curve 510 can then be saved in the local traffic management policy 130 for consumption by the dynamic function based traffic controller 126. In one configuration, the user interface element 504 also includes shading 520 that provides an indication of the location on the curve 510 of the current value for the corresponding metric 132. The shading 520 can be updated in real or near-real time as the current value of the represented metric 132 changes.

In the example shown in FIG. 5, the user has defined a curve 510 that defines a function for reducing the allowed CPU requests per second based upon the usage of heap memory by a VM. When the usage of the heap memory approaches 2 GB, no CPU requests will be permitted. In this regard, it should be appreciated that the curve 510 shown in FIG. 5 is merely illustrative and that other types of curves 510 can be defined using the GUI 500 shown in FIG. 5.

It should also be appreciated that the GUI 500 shown in FIG. 5 is merely illustrative and that functionality can be provided in other configurations for specifying other properties of a local service traffic management function and/or for viewing the real time metrics 132 described above. Other user interface elements, controls, and layouts can be utilized in other configurations. Other mechanisms can also or alternately be provided for permitting the definition of a local service traffic management function. Additionally, and as mentioned above with regard to FIGS. 3 and 4, a GUI similar to that shown in FIG. 5 can also be provided for defining a polynomial function based distributed traffic management policy 130A.

Figure 6:
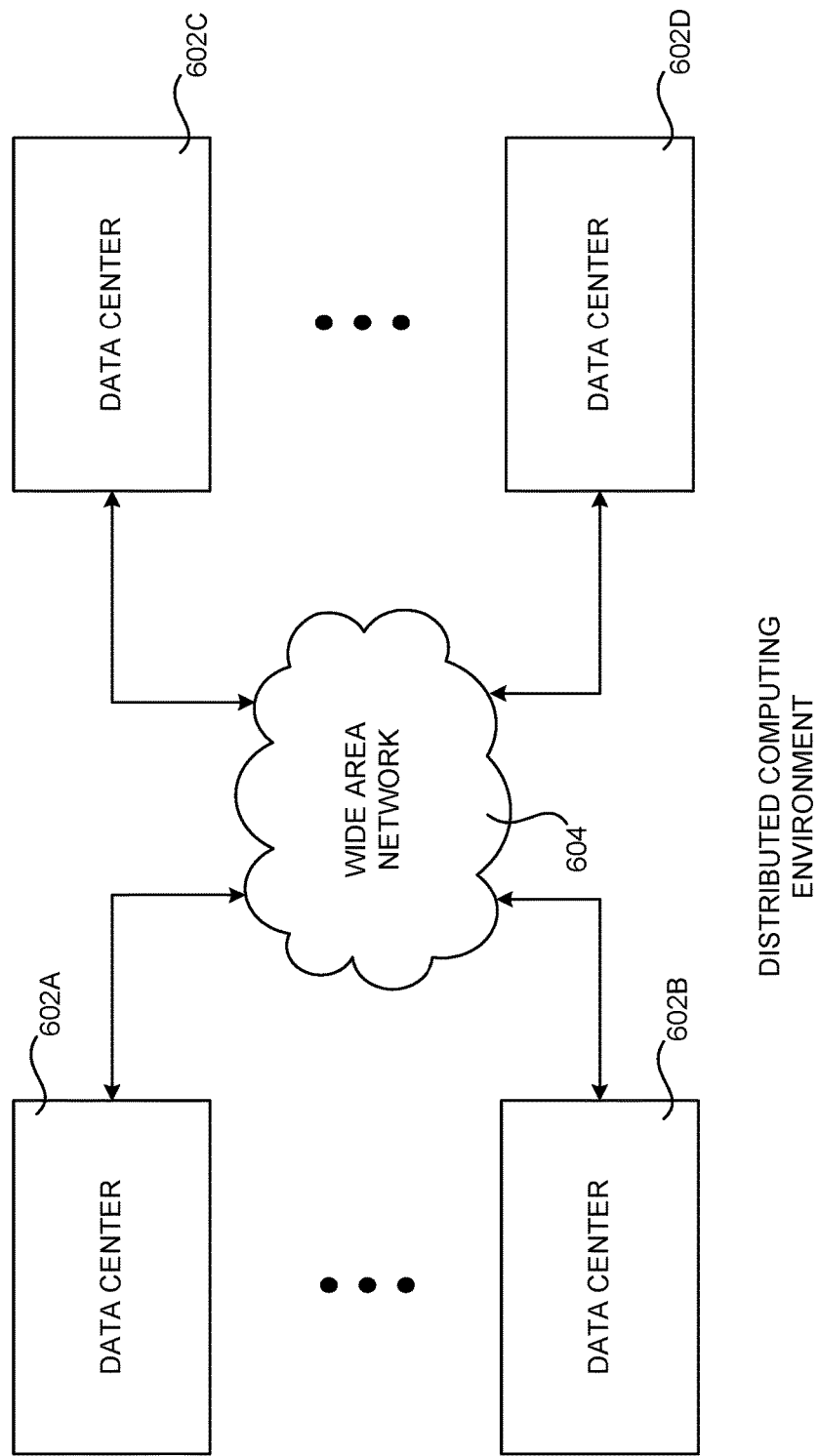
FIG. 6 is network diagram showing aspects of a distributed computing environment in which the configurations presented herein can be implemented.

FIG. 6 is a network diagram showing aspects of a distributed computing environment that can be utilized to provide an operating environment for the various technologies disclosed herein. In particular, the distributed computing environment shown in FIG. 6 can provide a suitable computing environment in which the various technologies described herein can be implemented. The distributed computing environment shown in FIG. 6 is configured using a service-oriented architecture ("SOA") in one implementation. Other configurations can also be utilized.

The distributed computing environment shown in FIG. 6 can provide computing resources for executing distributed programs on a permanent or an as-needed basis. The computing resources provided by the distributed computing environment can include various types of resources, such as data processing resources, data storage resources, data communication resources, and the like. Each type of computing resource can be general-purpose or can be available in a number of specific configurations. For example, data processing resources can be available as virtual machine instances. The instances can be configured to execute programs, including web servers, application servers, media servers, database servers, and other types of components such as those described in detail above. Data storage resources can include file storage devices, block storage devices, and the like. Each type or configuration of computing resource can be available in different sizes, such as large resources, consisting of many processors, large amounts of memory, and/or large storage capacity, and small resources consisting of fewer processors, smaller amounts of memory, and/or smaller storage capacity.

The computing resources provided by the distributed computing environment shown in FIG. 6 are furnished in one configuration by server computers and other components operating in one or more data centers 602A-602D (which might be referred to herein singularly "as a data center 602" or collectively as "the data centers 602"). The data centers 602 are facilities utilized to house and operate computer systems and associated components for providing a distributed computing environment. The data centers 602 can include redundant and backup power, communications, cooling, and security systems. The data centers 602 can also be located in geographically disparate locations. One illustrative configuration for a data center 602 that implements aspects of the technologies disclosed herein for local and distributed function based dynamic traffic management for network services will be described below with regard to FIG. 7.

Users of the distributed computing environment illustrated in FIG. 6 can access the computing resources provided by the data centers 602 over a wide-area network ("WAN") 604. Although a WAN 604 is illustrated in FIG. 6, it should be appreciated that a local-area network ("LAN"), the Internet, or any other networking topology known in the art that connects the data centers 602 to computing devices utilized by remote customers and other users can be utilized. It should also be appreciated that combinations of such networks can also be utilized.

The distributed computing environment can provide various interfaces through which aspects of its operation can be configured. For instance, various APIs can be exposed by components operating in the distributed computing environment shown in in FIG. 6 for configuring various aspects of its operation and for utilizing various aspects of the functionality that it provides. Other mechanisms for configuring the operation of components in the distributed computing environment and for utilizing these components can also be utilized.

According to configurations disclosed herein, the capacity of resources provided by the distributed computing environment can be scaled in response to demand. In this regard, scaling refers to the process of instantiating (which might also be referred to herein as "launching" or "creating") or terminating (which might also be referred to herein as "de-scaling") instances of computing resources in response to demand. Auto scaling is one mechanism for scaling computing resources in response to increases or lulls in demand for the resources. Additional details regarding the functionality provided by the data centers 602 will be provided below with regard to FIG. 7.

Figure 7:
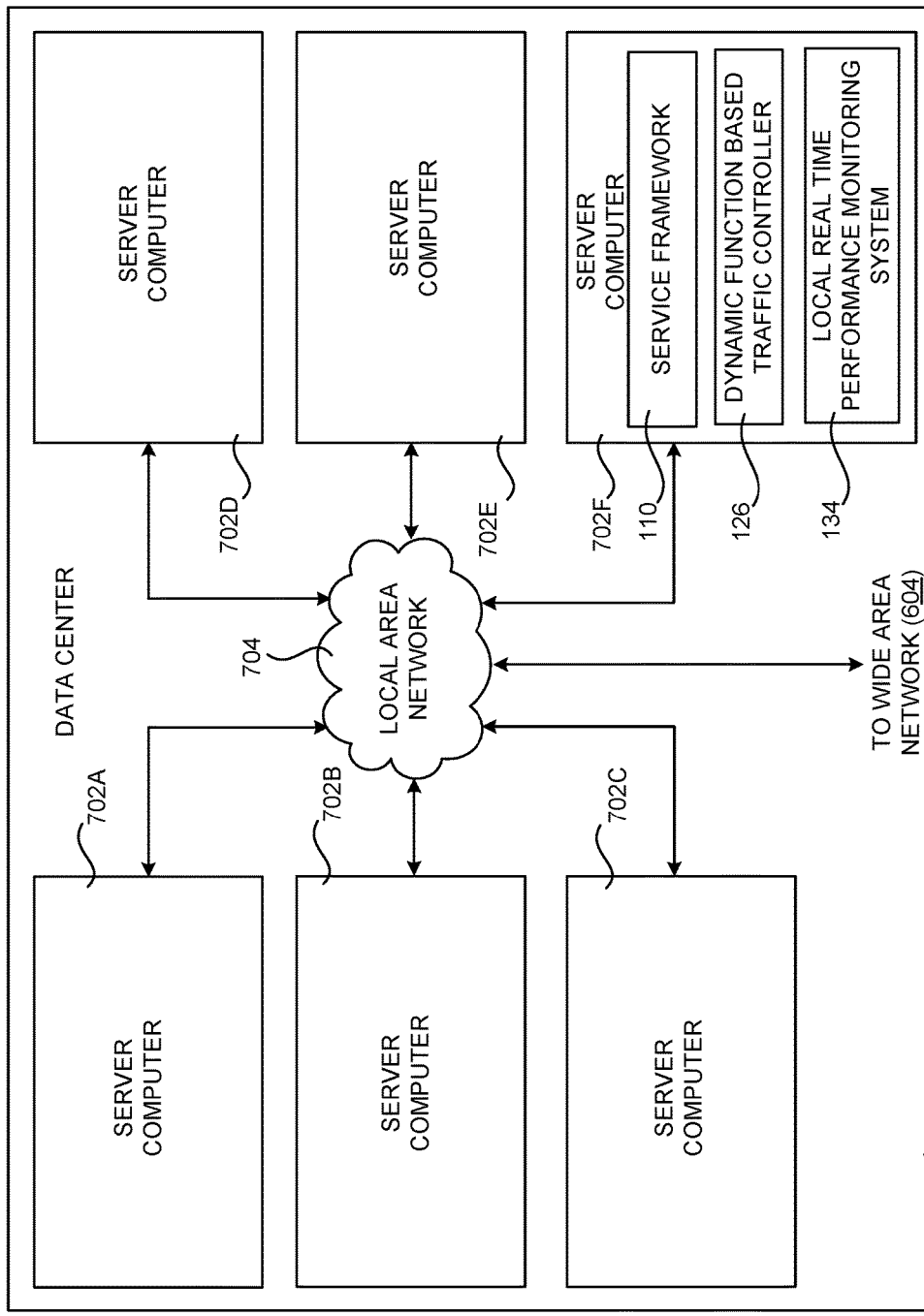
FIG. 7 is a network diagram illustrating aspects of a data center that can be utilized to implement the various technologies presented herein.

FIG. 7 is a computing system diagram that illustrates a configuration for a data center 602A that can be utilized to implement the various technologies described herein. The example data center 602A shown in FIG. 7 includes several server computers 702A-702F (which might be referred to herein singularly as "a server computer 702" or in the plural as "the server computers 702") for providing computing resources for executing distributed programs, such as those described in detail above.

The server computers 702 can be tower, rack-mount, or blade server computers configured appropriately for executing a distributed program or providing other functionality. The data center 602A shown in FIG. 7 also includes one or more server computers 702, such as the server computer 702F, that execute software components for providing aspects of the functionality described above. In particular, the server computer 702F can execute the service framework 110, the dynamic function based traffic controller 126, and the local real time performance monitoring system 134 described in detail above. The server computer 702F can also execute other software components not specifically shown in FIG. 7.

In the example data center 602A shown in FIG. 7, an appropriate LAN 704 is utilized to interconnect the server computers 702. The LAN 704 is also connected to the WAN 604 illustrated in FIG. 6. It should be appreciated that the network topology illustrated in FIGS. 6 and 7 has been greatly simplified for discussion purposes and that many more networks and networking devices can be utilized to interconnect the various computing systems disclosed herein. Appropriate load balancing devices or software modules can also be utilized for balancing a load between each of the data centers 602, between each of the server computers 702 in each data center 602, or between virtual machine instances executing within the distributed computing environment.

It should also be appreciated that the data center 602A described in FIG. 7 is merely illustrative and that other implementations can be utilized. Additionally, it should be appreciated that the disclosed functionality can be implemented in software, hardware or a combination of software and hardware. Additional details regarding one computer architecture for implementing the server computers 702 will be described below with regard to FIG. 8.

Figure 8:
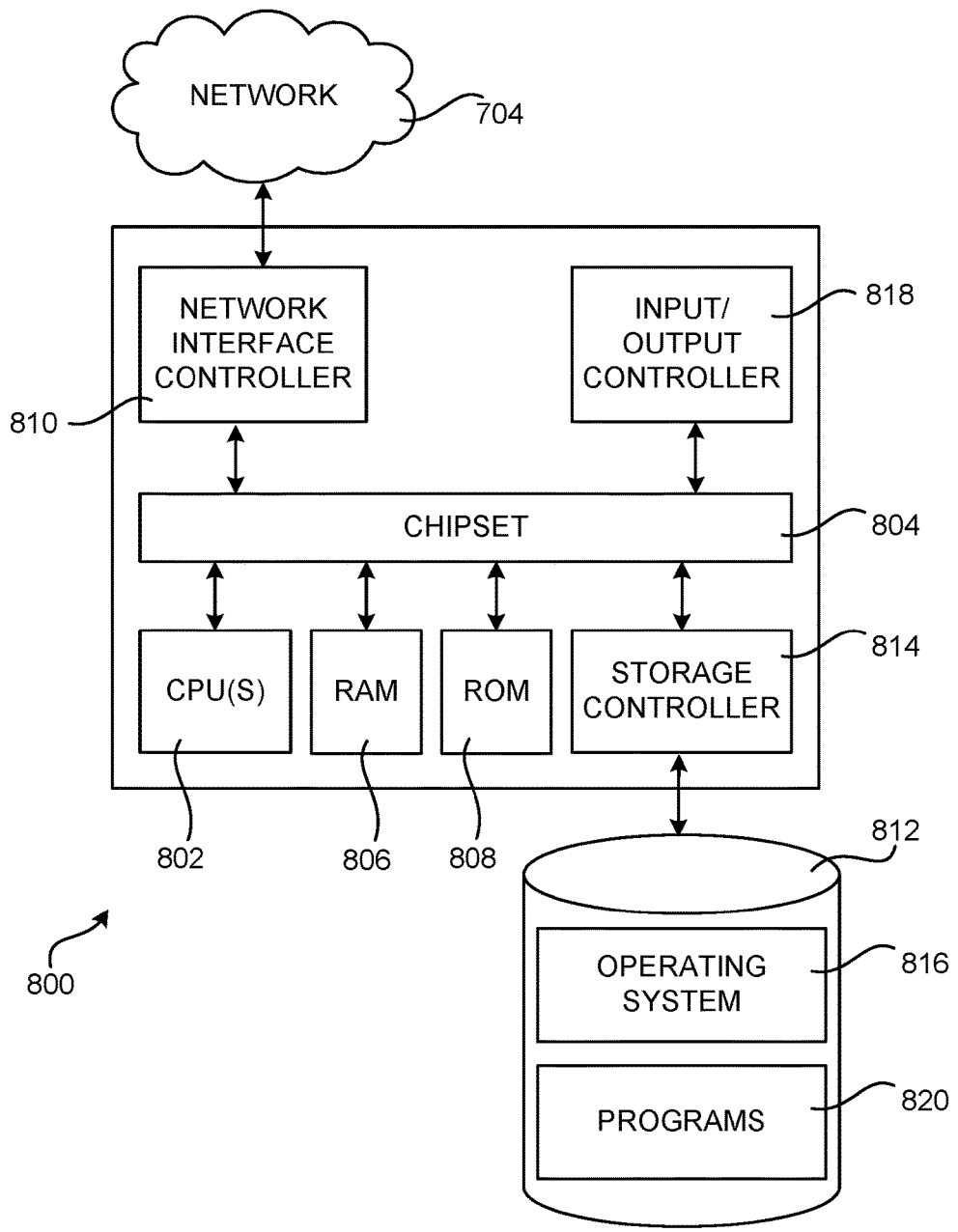
FIG. 8 is a computer architecture diagram showing one illustrative computer hardware architecture for implementing a computing device that can be utilized to implement aspects of the various configurations presented herein.

FIG. 8 shows an example computer architecture for a computer 800 capable of executing the program components described herein. The computer architecture shown in FIG. 8 illustrates a conventional server computer, workstation, desktop computer, laptop, tablet, network appliance, e-reader, smartphone, or other computing device, and can be utilized to execute any aspects of the software components presented herein, such as those described as executing within the data centers 602A-602D, on the server computers 602A-602F, or on any other computing system mentioned herein.

The computer 800 includes a baseboard, or "motherboard," which is a printed circuit board to which a multitude of components or devices can be connected by way of a system bus or other electrical communication paths. In one illustrative configuration, one or more CPUs 802 operate in conjunction with a chipset 804. The CPUs 802 can be programmable processors that perform arithmetic and logical operations necessary for the operation of the computer 800.

The CPUs 802 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 804 provides an interface between the CPUs 802 and the remainder of the components and devices on the baseboard. The chipset 804 provides an interface to a RAM 806, used as the main memory in the computer 800. The chipset 804 can further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM can also store other software components necessary for the operation of the computer 800 in accordance with the configurations described herein.

The computer 800 can operate in a networked environment using logical connections to remote computing devices and computer systems through a network, such as the local area network 704. The chipset 804 can include functionality for providing network connectivity through a NIC 810, such as a gigabit Ethernet adapter. The NIC 810 is capable of connecting the computer 800 to other computing devices over the network 704. It should be appreciated that multiple NICs 810 can be present in the computer 800, connecting the computer to other types of networks and remote computer systems.

The computer 800 can be connected to a mass storage device 812 that provides non-volatile storage for the computer. The mass storage device 812 can store system programs, application programs, other program modules, and data, which have been described in greater detail herein. The mass storage device 812 can be connected to the computer 800 through a storage controller 814 connected to the chipset 804. The mass storage device 812 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 812 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 812 is characterized as primary or secondary storage, and the like.

For example, the computer 800 can store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 812 by detecting the physical states or characteristics of one or more particular locations within the physical storage units.

In addition to the mass storage device 812 described above, the computer 800 can have access to other computer-readable storage media to store and retrieve information, such as program modules, data structures, or other data. It should be appreciated by those skilled in the art that computer-readable storage media can be any available media that provides for the storage of non-transitory data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 812 can store an operating system 816 utilized to control the operation of the computer 800. In one configuration, the operating system is the LINUX operating system. In another configuration, the operating system is the WINDOWS® SERVER operating system from MICROSOFT Corporation. According to a further configuration, the operating system is the UNIX operating system. It should be appreciated that other operating systems can also be utilized. The mass storage device 812 can also store other programs 820 and data utilized by the computer 800, such as the various software components and data described above. The mass storage device 812 can also store other programs and data not specifically identified herein.

In one configuration, the mass storage device 812 or other computer-readable storage media is encoded with computer-executable instructions which, when loaded into the computer 800, transforms the computer from a general-purpose computing system into a special-purpose computer capable of implementing the configurations described herein. These computer-executable instructions transform the computer 800 by specifying how the CPUs 802 transition between states, as described above. According to one configuration, the computer 800 has access to computer-readable storage media storing computer-executable instructions which, when executed by the computer 800, perform the routines 200 and 400, described above with regard to FIGS. 2 and 4, and the other operations described with reference to the other FIGS.

The computer 800 can also include an input/output controller 818 for receiving and processing input from a number of input devices, such as a keyboard, a mouse, a touchpad, a touch screen, an electronic stylus, or other type of input device. Similarly, the input/output controller 818 can provide output to a display, such as a computer monitor, a flat-panel display, a digital projector, a printer, a plotter, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for local and distributed function based dynamic traffic management for network services have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method for management of service requests directed to a network service, the method comprising:
receiving, at a service host computer, a service request directed to the network service, wherein the network service is executing locally at the service host computer;
responsive to receiving the service request, determining a classification of the service request;
determining whether the service request is to be processed by the network service based upon the classification of the service request, one or more real time metrics associated with the network service, and a local traffic management policy, wherein the local traffic management policy defines a polynomial traffic management function having an input comprising a value of at least one of the one or more real time metrics and an output defining a throttle rate at which to throttle service requests of the classification;
rejecting the service request responsive to determining that the service request is not to be processed by the network service; and
causing the service request to be processed by the network service responsive to determining that the service request is to be processed by the network service.

2. The computer-implemented method of claim 1, wherein the classification of the service request is determined based, at least in part, on one or more attributes of the service request.

3. The computer-implemented method of claim 1, wherein the classification of the service request is determined based, at least in part, upon metadata associated with the service request generated by one or more handlers within a service framework executing on the service host computer.

4. The computer-implemented method of claim 1, further comprising a graphical user interface for defining the polynomial traffic management function.

5. The computer-implemented method of claim 4, wherein the graphical user interface comprises a user interface element for defining a curve representing the polynomial traffic management function.

6. The computer-implemented method of claim 1, further comprising:
providing the one or more real time metrics associated with the network service to a distributed performance monitoring system;
receiving one or more update events from a dynamic function based traffic controller in communication with the distributed performance monitoring system; and
adjusting the throttle rate based, at least in part, upon the one or more update events.

7. The computer-implemented method of claim 6, wherein the dynamic function based traffic controller is configured to compute the throttle rate based, at least in part, upon a distributed traffic management policy, the one or more real time metrics received from the service host computer, and real time metrics received from at least one other service host computer.

8. A non-transitory computer-readable storage medium having computer-executable instructions stored thereupon which, when executed by a service host computer, cause the service host computer to:
obtain a request directed to a network service, wherein the network service is executing locally at the service host computer;
determine a classification of the request;
determine whether the request is to be processed by the network service based upon the classification of the request, one or more metrics associated with the network service, and a local traffic management policy, wherein the local traffic management policy defines a polynomial traffic management function having an input comprising a value of at least one of the one or more metrics and an output defining a throttle rate at which to throttle requests having the classification;
cause the request to be rejected responsive to determining that the request is not to be processed by the network service; and
cause the request to be processed by the network service responsive to determining that the request is to be processed by the network service.

9. The non-transitory computer-readable storage medium of claim 8, wherein determining whether the request is to be processed by the network service is determined by a dynamic function based traffic controller executing in conjunction with at least one handler in a service framework executing on a same service host computer as the network service.

10. The non-transitory computer-readable storage medium of claim 9, wherein there is a plurality of handlers executed in a specified order.

11. The non-transitory computer-readable storage medium of claim 10, wherein a first handler of the plurality of handlers adds metadata to the service request and wherein the service request is transmitted to the network service for processing in response to completion of execution of a second handler, wherein the second handler is last in the specified order.

12. The non-transitory computer-readable storage medium of claim 8, wherein the one or more metrics are sampled at a predefined rate.

13. The non-transitory computer-readable storage medium of claim 8, having further computer-executable instructions stored thereupon to provide a graphical user interface for defining the polynomial traffic management function, the graphical user interface comprising a user interface element for defining a curve representing the polynomial traffic management function.

14. The non-transitory computer-readable storage medium of claim 8, having further computer-executable instructions stored thereupon to:
provide the one or more metrics associated with the network service to a distributed performance monitoring system;
receive one or more update events from a dynamic function based traffic controller in communication with the distributed performance monitoring system; and
adjust the throttle rate based, at least in part, upon the one or more update events.

15. An apparatus, comprising:
one or more processors; and
at least one non-transitory computer-readable storage medium having instructions stored thereupon which, when executed by the one or more processors, cause the processors to
receive a request directed to a network service,
determine a classification of the request,
determine whether the request is to be processed by the network service based upon the classification of the request, one or more metrics associated with the network service, and a local traffic management policy, wherein the local traffic management policy defines a polynomial traffic management function having an input comprising a value of at least one of the one or more metrics and an output defining a throttle rate at which to throttle requests having the classification,
cause the request to be rejected responsive to determining that the request is not to be processed by the network service, and
cause the request to be processed by the network service responsive to determining that the request is to be processed by the network service.

16. The apparatus of claim 15, wherein determining whether the request is to be processed by the network service is determined by a dynamic function based traffic controller executing in conjunction with a handler in a service framework executing on a service host computer executing the network service.

17. The apparatus of claim 15, wherein the non-transitory computer-readable storage medium has further instructions stored thereupon to provide a graphical user interface for defining the polynomial traffic management function, the graphical user interface comprising a user interface element for defining a curve representing the polynomial traffic management function.

18. The apparatus of claim 15, wherein the classification of the request is determined based, at least in part, upon metadata associated with the request generated by one or more handlers within a service framework executing on a service host computer executing the network service.

19. The apparatus of claim 15, wherein the non-transitory computer-readable storage medium has further instructions stored thereupon to:
provide the one or more metrics associated with the network service to a distributed performance monitoring system;
receive one or more update events from a dynamic function based traffic controller in communication with the distributed performance monitoring system; and
adjust the throttle rate based, at least in part, upon the one or more update events.

20. The apparatus of claim 19, wherein the dynamic function based traffic controller is configured to compute the throttle rate based, at least in part, upon a distributed traffic management policy and metrics received from a plurality of service host computers.

* * * * *